United States Patent [19]
Goebel et al.

[11] 3,848,145
[45] Nov. 12, 1974

[54] ELECTRIC MOTOR VENTILATION

[75] Inventors: Robert W. Goebel; George R. Marous, both of Springfield, Ohio

[73] Assignee: Robbins & Myers, Inc., Springfield, Ohio

[22] Filed: Jan. 22, 1973

[21] Appl. No.: 325,229

[52] U.S. Cl. ............... 310/60, 310/62, 312/236
[51] Int. Cl. ............................................. H02k 9/06
[58] Field of Search ........................... 310/58–63; 317/100, 120; 312/236

[56] References Cited
UNITED STATES PATENTS

| | | | |
|---|---|---|---|
| 2,488,365 | 11/1949 | Abbott et al. | 310/62 |
| 2,512,905 | 6/1950 | Willits | 310/62 |
| 2,516,184 | 7/1950 | Christie | 317/100 |
| 3,175,109 | 3/1965 | Stone | 310/62 X |
| 3,243,617 | 3/1966 | Cunningham | 310/63 |
| 3,407,317 | 10/1968 | Honsinger | 310/62 X |

FOREIGN PATENTS OR APPLICATIONS 1,129,224  5/1962  Germany ............................ 310/59

*Primary Examiner*—J. D. Miller
*Assistant Examiner*—Robert J. Hickey
*Attorney, Agent, or Firm*—Jacox & Meckstroth

[57] ABSTRACT

An electric motor which is capable of self-cooling and which is also capable of cooling elements adjacent thereto when the motor and other operating elements are disposed within a cabinet, or housing, or the like. The motor is provided with means for causing flow of air therethrough in sufficient volume to maintain the motor at a suitable temperature and is also capable of causing flow of air adjacent other elements for the cooling thereof.

4 Claims, 7 Drawing Figures

PATENTED NOV 12 1974  3,848,145
FIG-1
FIG-2
FIG-3
FIG-4
FIG-5
FIG-6
FIG-7
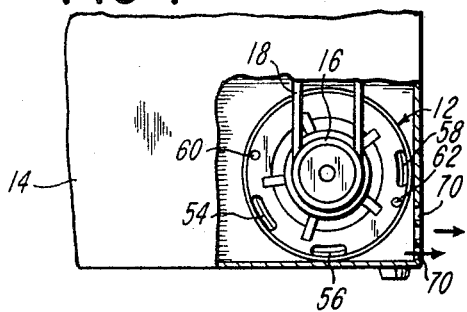
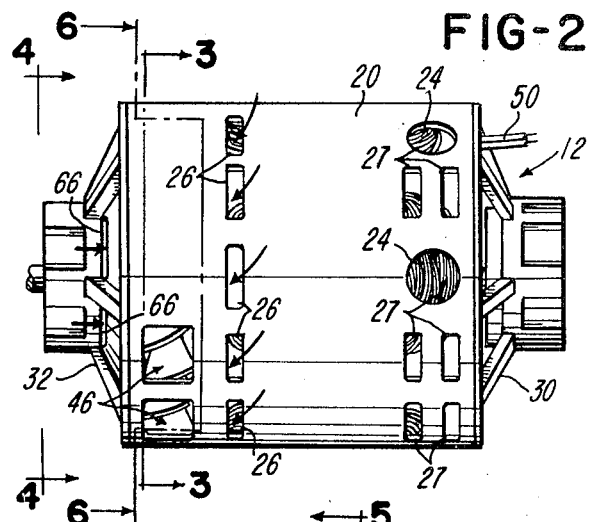
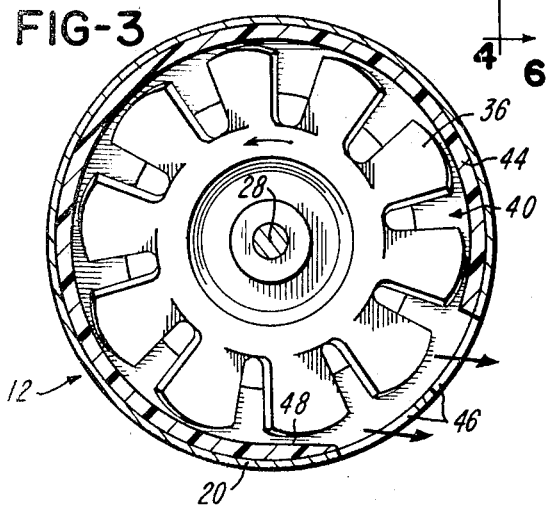
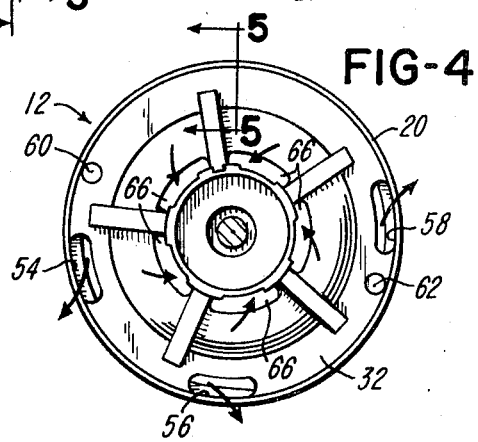
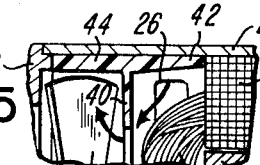
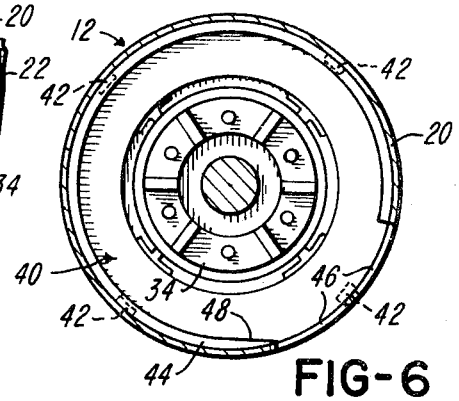

ELECTRIC MOTOR VENTILATION

BACKGROUND OF THE INVENTION

Numerous types of business machines contain an electric motor and other elements or members within which heat is created during operation thereof. The motor is usually the only element or member which is capable of self cooling. The motor is thus ordinarily the only element in the business machine which may be capable of cooling other elements of the machine, as well as itself.

It is an object of this invention to provide an electric motor which, when disposed within a cabinet or other housing, such as the cabinet or housing of a business machine or the like having other elements, is capable of cooling other elements in the cabinet, as well as the motor.

Another object of this invention is to provide such an electric motor which can be produced at relatively low costs and which is long-lived.

Other objects and advantages reside in the construction of parts, the combination thereof, the method of manufacture, and the mode of operation, as will become more apparent from the following description.

BRIEF DESCRIPTION OF THE VIEWS OF THE DRAWING

FIG. 1 is a fragmentary elevational view, with parts broken away, showing a motor of this invention within the housing of a business machine or the like.

FIG. 2 is an elevational view of a motor of this invention, drawn on a larger scale than FIG. 1.

FIG. 3 is an enlarged sectional view taken substantially on line 3—3 of FIG. 2.

FIG. 4 is a sectional view taken substantially on line 4—4 of FIG. 2 and drawn on substantially the same scale as FIG. 2.

FIG. 5 is a fragmentary enlarged sectional view taken substantially on line 5—5 of FIG. 4.

FIG. 6 is a sectional view taken substantially on line 6—6 of FIG. 2.

FIG. 7 is a perspective exploded view of a motor of this invention.

DETAILED DESCRIPTION OF THE INVENTION

A motor 12 of this invention is adapted to be mounted in any suitable manner within a housing or cabinet 14 or the like, shown in FIG. 1, of a business machine or the like. The motor 12, as shown in FIG. 1, has a pulley 16 and drive belt 18 for operation of another element or elements, not shown, within the cabinet or housing 14.

The motor 12 is shown as having a shell 20 provided with a stator 22 and windings 24. The shell 20 has a plurality of openings 26 and 27 which partially expose the stator 22 and the windings 24.

A shaft 28 is rotatably journalled in end bells or end heads 30 and 32 and has secured thereto a rotor 34 and a fan 36 which are positioned within the shell 20.

Within the shell 20 and separating the windings 24, and stator 22 from the fan 36 is an annular baffle 40. A plurality of fingers 42 are integral with the baffle 40, normal thereto, and engage the stator 22 to space the baffle 40 from the windings 24, as illustrated in FIG. 5. Also integral with the baffle 40 is a shroud 44 which is substantially normal to the baffle 40 and extends laterally therefrom. The shroud 44 engages the inner surface of the shell 20 around a portion thereof, encompasses the fan 36, and is positioned between the fan 36 and the portion of the shell 20 which encompasses the fan 36. The shell 20 has an air exhaust passage or passages 46 spaced radially from the blades of the fan 36. The shroud 44 has an opening therein so that the shroud 44 does not cover the air exhaust passages 46. The shroud 44 has a tapered portion 48 adjacent the air exhaust passages 46.

The end bell or end head 30 is shown in FIG. 2 as having electrical conductors 50 extending therethrough and joined to the windings 24. The end bell or end head 30 has suitable ventilation openings not shown.

The end bell 32 which is adjacent the shroud 44, as shown in FIG. 4, has a plurality of air exhaust passages therethrough, herein shown as air exhaust passages 54, 56, and 58. The end bell 32 also has air exhaust passages 60 and 62. The end bell 32 also has air inlet passages 66 adjacent the central portion thereof.

The motor 12 is positioned in the cabinet 14 so that the ventilator air exhaust passages 46 are adjacent one or more openings or ports 70 in the lower right hand portion of the cabinet 14 as shown in FIG. 1. Preferably the fan rotates in the direction in which the tapered portion 48 of the shroud has a gradually decreasing thickness dimension, as illustrated by the rotation arrow in FIG. 3.

Air flows into the shell 20 through the openings 26, as illustrated in FIGS. 2 and 5. The air is then directed by the baffle 40 to the fan 36, as illustrated in FIG. 5. The shroud 44, having the tapered portion 48, in cooperation with the fan 36 causes the air which is drawn into the shell 20 to be exhausted therefrom in relatively large quantities through the air exhaust passages 46. Air also flows into the shell 20 through the inlet passages 66 in the end bell 32. Air flows outwardly from the cabinet or housing 14 through the openings or ports 70. Air is also exhausted from the shell 20 into the cabinet or housing 14 through the air exhaust passages 54, 56, 58, 60 and 62.

It has been found that a motor 12 constructed and operated in the manner discussed above and as shown in the drawings is capable of maintaining a suitable temperature within itself during operation thereof and is also capable of cooling other elements which operate within the housing or cabinet 14. For example, the motor 12 causes movement of air within the cabinet 14 for cooling of such elements as a typewriter ribbon region and elements which engage the ribbon during operation of the motor 12.

Although the preferred embodiment of the apparatus has been described, it will be understood that within the purview of this invention various changes may be made in the form, details, proportion and arrangement of parts, the combination thereof, and mode of operation, which generally stated consist in apparatus capable of carrying out the objects set forth, as disclosed and defined in the appended claims.

The invention having thus been described, the following is claimed:

1. In an electric motor adapted for use within the cabinet of a business machine and including a shell supporting a stator, a rotor extending through said stator and including a rotor shaft, a set of end bells mounted on the end portions of said shell and confining bearings for rotatably supporting said shaft, an air exhaust opening within one end portion of said shell, and a centrifugal fan mounted on said rotor shaft within said one end portion of said shell between said stator and one of said end bells, the improvement comprising an annular radial baffle wall positioned within said shell between said stator and said fan and defining a first air inlet on one axial end of said fan, a substantially cylindrical shroud extending around said fan and having a peripheral opening aligned with said air exhaust opening within said shell, said cylindrical shroud and said radial baffle wall being integral and forming a unit within said shell, said one end bell defining another air inlet opening on the opposite axial end of said fan, and said one end bell also defining an air exhaust opening disposed radially outwardly of said air inlet opening within said one end bell to effect improved cooling and ventilating of said motor and said cabinet.

2. An electric motor as defined in claim 1 wherein said one end bell defines two of said air exhaust openings disposed circumferentially generally 90° apart adjacent said shell.

3. An electric motor as defined in claim 1 wherein said unit of said radial baffle wall and said cylindrical shroud comprise a body of plastics material.

4. An electric motor as defined in claim 1 wherein said shroud includes an inwardly facing and substantially flat tapered surface extending to said peripheral opening within said shroud.

* * * * *